H. M. NAUGLE.
LUBRICATING BOLT.
APPLICATION FILED NOV. 19, 1919.

1,384,271.

Patented July 12, 1921.
2 SHEETS—SHEET 2.

INVENTOR
Harry M. Naugle
BY Frease, Merkel, Saywell and Bond
ATTYS

UNITED STATES PATENT OFFICE.

HARRY M. NAUGLE, OF CANTON, OHIO, ASSIGNOR TO THE ALLOY PARTS MANUFACTURING COMPANY, OF CANTON, OHIO, A CORPORATION OF OHIO.

LUBRICATING-BOLT.

1,384,271.  Specification of Letters Patent.  Patented July 12, 1921.

Application filed November 19, 1919. Serial No. 339,094.

*To all whom it may concern:*

Be it known that I, HARRY M. NAUGLE, a citizen of the United States, residing at Canton, in the county of Stark and State of Ohio, have invented a new and useful Lubricating-Bolt, of which the following is a specification.

The invention relates to means for lubricating the journals and bearings formed by bolts used in the eyes of springs to connect the same to the shackle or chassis of an automobile; and the object of the invention is to use a tubular bolt forming a reservoir for the lubricant, and to provide the same with means for ejecting the lubricant into the journal bearing midway between its ends, in such a manner that the cavity of the bolt from end to end, may be utilized as a reservoir from which all the lubricant may be ejected by the means employed, and that the reservoir can be filled without the use of a grease gun.

Journal bearings of this character have a considerable length compared with the diameter of the journals, and when lubrication is applied to either one or both ends of the bearings, the same does not always find its way to the middle portion thereof, which may thus become dry; and this difficulty is increased in spring bolt bearings, and the like, where the ends of the journals are exposed to the mud and dirt of road and to the corroding action of rain water and atmospheric gases, which clog the end portions of the bearing and prevent the flow of the lubricant into the middle portion thereof.

The present improvement overcomes these difficulties by using a tubular bolt with suitable end closures and one or more radial apertures midway between its ends, and providing therein an axial rod bearing against the end closures and having an operating head extending through one of the end closures, with piston plungers operatively mounted on reversely pitched threads on the rod in each end half of the bolt.

A preferred embodiment of the invention is illustrated in the accompanying drawings, forming part hereof, in which—

Figure 1:
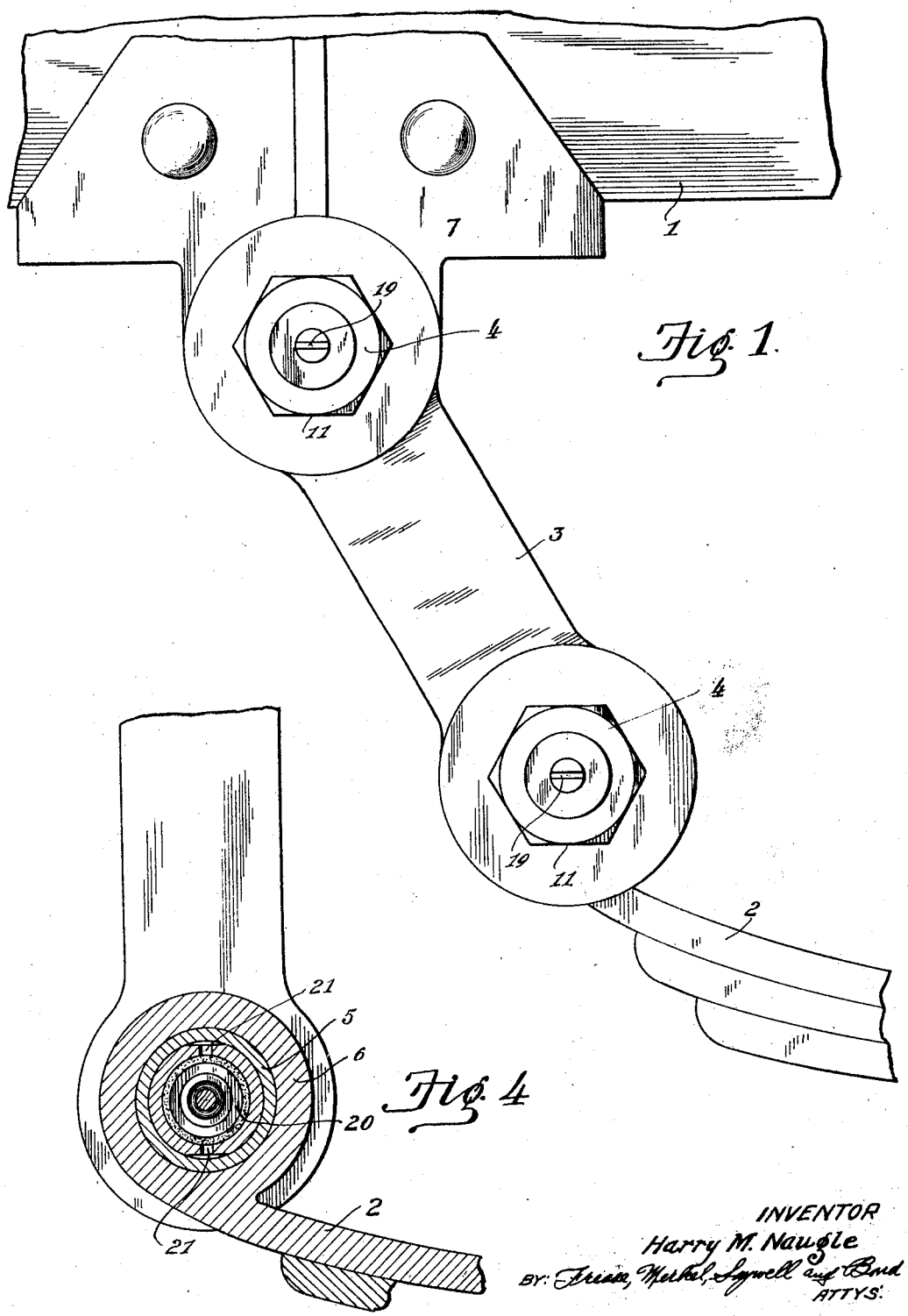
Figures 2, 3:
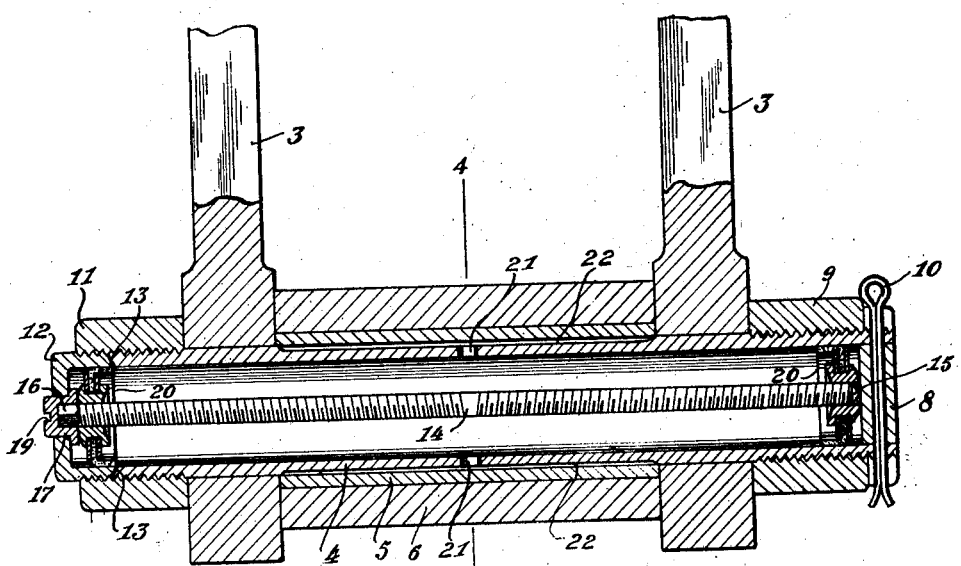

Figure 1 is a side elevation of a portion of an automobile chassis and the end of a spring with an intervening shackle, having pivotal connections embodying the invention;

Fig. 2, a longitudinal section through the eye and the bolt therein, showing the journal formed by the bolt and the bearing formed in the eye of the spring;

Fig. 3, is a similar section of the eye of the spring showing a side view of the bolt therein; and Fig. 4 is a cross section on line 4—4, Figs. 2 and 3. Similar numerals refer to corresponding parts throughout the drawings.

A portion of the chassis of an automobile is shown at 1, and a portion of the leaf spring 2 is connected thereto by means of the usual shackles 3.

The pivotal connections are formed by the bolts 4 located in bearings formed in the chassis and in the spring; and this bearing may be a bushing 5 secured in the eye 6 of the spring or in a bracket 7 secured to the chassis of the automobile.

The bolt 4 is made in the form of a hollow cylinder or tube and one end may be closed by a plug 8 secured within the end of the bolt. This end of the bolt is preferably provided with a castellated nut 9 locked in position by a cotter pin 10, although such construction of a closure and the nut is not essential.

The other end of the bolt is provided with an ordinary nut 11 into the outer portion of which may be screwed the cup shaped cap 12 conforming in diameter to the tubular bolt; and the rim of the cap and the end of the bolt are preferably coned or beveled, as shown at 13, to make a tight and locking joint when the cap is screwed into the nut.

The screw rod 14 is provided in the bolt and is preferably located in the longitudinal axis. One end 15 of the rod may be coned and the point of this end may abut the end closure 8 of the bolt; while the other end of the rod is provided with a head 16 extending through a central bearing 17 provided in the cap which closes the end of the bolt, and having a flange abutting the inside of the cap. The protruding head of the rod is provided with a diametric slot 19 adapted to receive a coin or screw driver for rotating the rod.

A plunger 20 is mounted on each end of the rod, which in turn is provided with oppositely pitched threads for moving the plungers to and from the middle of the bolt by a rotation of the rod; and one or more radial apertures 21 are provided in the wall of the bolt 4 midway between the ends of the journal bearing 5, and the periphery of the journal portion of the bolt is flattened or grooved longitudinally each way from the apertures, thus forming a channel along which lubricant may flow from the middle apertures in the bolt, to the extreme ends of the journal bearing.

For filling the cavity of the bolt with lubricant, the plungers may be moved to the extreme ends of the bolt by a rotation of the rod, after which the cap closure may be removed and the rod turned out of the plunger at the coned end of the rod, whereupon the rod and the other plunger may be withdrawn from the cavity of the bolt, leaving the one plunger in the closed end thereof.

The cavity of the bolt is then entirely filled with grease or other form of lubricant, by means of a scoop, spoon or other utensil, whereupon the rod may be reinserted in the bolt, and its coned end screwed into the plunger in the closed end thereof, after which the cap 12 is screwed into the nut 11 to close the other end of the bolt, and the same is ready for use.

With the reservoir of the bolt thus filled with grease, it is evident that a proper rotation of the rod will move the plungers in unison, toward the middle of the bolt, thus ejecting the lubricant through the apertures 2 at the middle of the bearing; and if the journal is provided with the longitudinal channels 22 the grease will freely flow along these channels to the extreme end of the bearing. At any event, the grease ejected through the apertures will lubricate the middle portion of the bearing and will naturally work its way to the ends thereof in case channels therefor are not provided.

By this construction and arrangement it is evident that the entire length of the tubular bolt, including the end portions extending through the shackle arms and the nuts, may be utilized as a receptacle for the plungers and the lubricant; and also that all the lubricant therein can be ejected by a movement of the plungers toward each other until they meet at the middle apertures in the bolt; thus giving the bolt a maximum capacity for receiving the lubricant, and a maximum capacity for ejecting the same into the journal bearing. Furthermore, the cavity of the bolt can be filled without the use of a grease gun.

I claim:

1. A hollow bolt forming a journal in the bearing of a spring eye or the like, an aperture in the bolt at the middle of the bearing, plungers in each end of the bolt, and means for simultaneously moving the plungers from the ends of the bolt to and from the middle aperture.

2. A hollow bolt forming a journal in the bearing of a spring eye or the like, an aperture in the bolt at the middle of the bearing, longitudinal channels in the periphery of the bolt each way from the aperture, plungers in each end of the bolt, and means for simultaneously moving the plungers from the ends of the bolt to and from the middle aperture.

3. The combination of a spring eye or the like forming a continuous cylindric bearing, a hollow bolt or the like forming a journal from end to end of the bearing, an aperture in the bolt at the middle of the bearing, longitudinal grooves in the periphery of the bolt each way from the aperture, plungers in each end of the bolt, and means for simultaneously moving the plungers from the ends of the bolt, to and from the middle aperture.

4. The combination of a spring eye or the like forming a continuous cylindric bearing, a hollow bolt or the like forming a journal from end to end of the bearing, an aperture in the bolt at the middle of the bearing, plungers in each end of the bolt, and means for simultaneously moving the plungers from the ends of the bolt, to and from the middle aperture.

5. A hollow bolt forming a journal in the bearing of a spring eye or the like, an aperture in the bolt at the middle of the bearing, a longitudinal shaft oppositely threaded in each end half of the bolt, said shaft having one end free in the bolt and a head on the other end protruding through the end of the bolt; and opposing plungers operated by the shaft from the ends of the bolt to and from the ends of the middle aperture.

6. A hollow bolt forming the bearing in a spring eye or the like, an aperture in the bolt at the middle of the bearing, a longitudinal shaft oppositely threaded in each end half of the bolt, and opposing plungers operated by the shaft from the ends of the bolt to and from the middle aperture.

In testimony that I claim the above, I have hereunto subscribed my name.

HARRY M. NAUGLE.